United States Patent [19]

Urry

[11] 4,074,023
[45] Feb. 14, 1978

[54] PRIMARY DRY CELL WITH MASKED SEPARATOR

[75] Inventor: Lewis Frederick Urry, North Olmsted, Ohio

[73] Assignee: Union Carbide Corporation, New York, N.Y.

[21] Appl. No.: 564,490

[22] Filed: Apr. 2, 1975

[51] Int. Cl.² .............................................. H01M 2/12
[52] U.S. Cl. ....................................... 429/56; 429/57; 429/133; 429/143
[58] Field of Search .................. 136/107, 102, 100 M; 429/57, 53, 56, 133–135, 140, 143, 146, 166

[56] References Cited

U.S. PATENT DOCUMENTS

| 1,497,316 | 6/1924 | Askin | 136/107 |
| 1,601,475 | 9/1926 | Heise | 429/133 |
| 2,238,376 | 4/1941 | Spicer | 136/107 |
| 2,822,416 | 2/1958 | Parkinson | 136/107 |

Primary Examiner—Charles F. LeFevour
Attorney, Agent, or Firm—Eugene Lieberstein

[57] ABSTRACT

Primary dry cell comprising a metal anode cup having therein a cathode mix containing an electrolyte, separated from the side wall of the anode cup by an electrolyte-permeable separator, and having an open end which is gas-tightly sealed by a closure including a vent, wherein an electrolyte-impermeable mask is positioned adjacent to the separator and extends substantially the whole distance between the bottom of the anode cup and the void space defined between the cathode mix and the seal closure.

13 Claims, 3 Drawing Figures

PRIMARY DRY CELL WITH MASKED SEPARATOR

This invention relates to primary dry cells in general, and more particularly to certain improvements in magnesium dry cells.

Magnesium dry cells are used by the military as a power source for field radios and other similar electronic equipment. These cells have a high working voltage and they can be assembled into cell batteries having a high capacity per unit volume. However, magnesium cells are prone to generate large quantities of gas on discharge which, if not properly vented, can result in cell rupture and possible damage to the equipment. Generally, the rate of gas generation is dependent on the rate of discharge and more gas is generated at higher drains. Magnesium cells, therefore, must pass rather stringent test requirements. One of these requirements is that the cells should be capable of rapidly venting gas from inside the cells, and thus avoid cell rupture, when they are subjected to certain abusive conditions that may occur in the field, such as when the cells are inadvertently placed on a short circuit load.

The problem that is most frequently encountered in meeting this requirement is that some of the gas that is generated under abusive conditions becomes entrapped inside the cell and cannot be vented. The vent through which the gas escapes to the ambient environment is located in the seal closure at the top of the cell. Gas that is generated near the bottom of the cell owing to the anodic activity of the metal anode cup bottom, must pass completely through the cathode mix containing electrolyte and into the void space located beneath the closure where the gas accumulates prior to its escape through the vent. However, some of this gas becomes trapped and the resultant gas pressure that develops pushes on the cathode mix and actually causes it to rise inside the cell like a piston, and eventually the cathode mix comes into contact with the underneath side of the closure and blocks the vent. As the gas pressure continues to rise, the cell will eventually split or the seal closure will be pushed out from the cell.

Attempts have been made to solve this problem by placing mechanical restraint on the cathode mix to prevent its movement, but these attempts have not consistently given positive results, and it has become evident that some means must be devised to enable the gas to pass around the cathode mix inside the cell.

Passage of gas around the cathode mix might ordinarily be achieved by employing a conventional porous paper separator surrounding the cathode mix except that the porous separator lies adjacent to the side wall of the of the anode cup which corrodes as the electrochemical reaction proceeds during cell discharge. This anode corrosion causes a gas-impermeable reaction product to build up in the anode-separator region which blocks the open channels that exist in and around the separator between the cathode mix and the side wall of the anode cup and thus prohibits the passage of gas from the bottom of the cell.

The principal object of this invention is therefore to provide a gas-venting passageway around the cathode mix in a primary dry cell.

Another object of this invention is to provide a primary dry cell employing an electrolyte-permeable separator in which the open channels in and around the separator are maintained as a gas-venting passageway by masking off a portion of the separator or anode cup to prohibit the formation of a gas-impermeable reaction product.

With the foregoing and other objects in view, there is provided in accordance with the invention a primary dry cell, and especially a magnesium dry cell, comprising a metal anode cup having therein a cathode mix contaning an electrolyte, separated from the side wall of the anode cup by an electrolyte-permeable separator, and having an open end gas-tightly sealed by a closure including a vent, wherein an electrolyte-impermeable mask is positioned adjacent to the separator and extends substantially the whole distance between the bottom of the anode cup and the void space defined between the cathode mix and the seal closure. The mask may be in the form of a longitudinal or spiral stripe made from an electrolyte-impermeable material and may be applied to either side of the separator or to the side wall of the anode cup. The longitudinal or spiral stripe may be used alone or in combination with a circumferential stripe applied to either side of the separator or to the side wall of the anode cup.

Although the invention will be illustrated and described herein as applied to a magnesium dry cell, it is nevertheless not intended to be limited to such cell in particular, since the principles of the invention can be applied equally as well to other primary dry cell systems.

The construction and method of operation of the invention, together with additional objects and advantages thereof, will be best understood from the following description of specific embodiments when read in connection with the accompanying drawings, in which.

Figure 1:
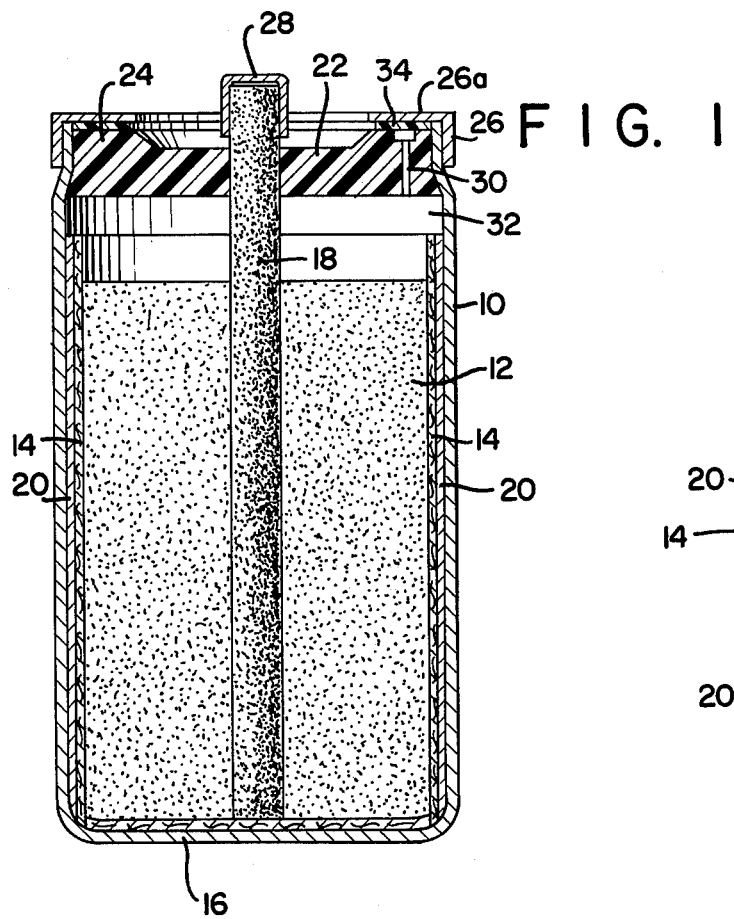
FIG. 1 is an elevational view, in section, of a magnesium dry cell constructed in accordance with the invention.

Referring now to the drawing in detail, there is shown a primary dry cell comprising a cylindrical anode cup 10 made of magnesium metal or a magnesium alloy, and having an upper open end and a closed bottom end. Within the anode cup 10 there is a cathode mix 12 comprising particles of an oxidic depolarizer, such as manganese dioxide, finely-divided conductive material, such as acetylene black, and a liquid electrolyte. Suitably, the electrolyte may be an aqueous magnesium perchlorate solution, for example. A gas- and electrolyte-permeable separator 14 is interposed between and in contact with the cathode mix 12 and the side wall of the anode cup 10. Suitably, the separator 14 may be made from a sheet of porous kraft paper, for example, which is wound together to form a cylinder or sleeve. During assembly, the separator 14 is placed adjacent to the side wall of the anode cup 10 prior to insertion of the cathode mix 12. The cathode mix 12 is separated from the anode cup bottom by a porous paper or cardboard washer 16. The washer 16 is permeable to the electrolyte and renders the anode cup bottom anodically active along with the side wall of the anode cup 10. A central carbon electrode element 18 is embedded in the cathode mix 12 and protrudes slightly beyond the upper open end of the anode cup 10.

Figure 3:
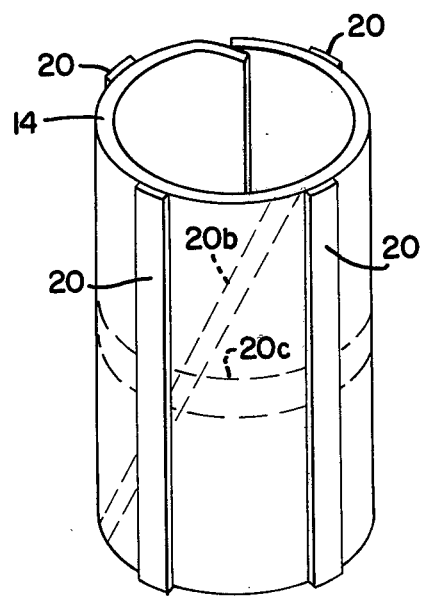
FIG. 3 is a perspective view of the masked separator used in the cell of FIG. 1.
Figure 2:
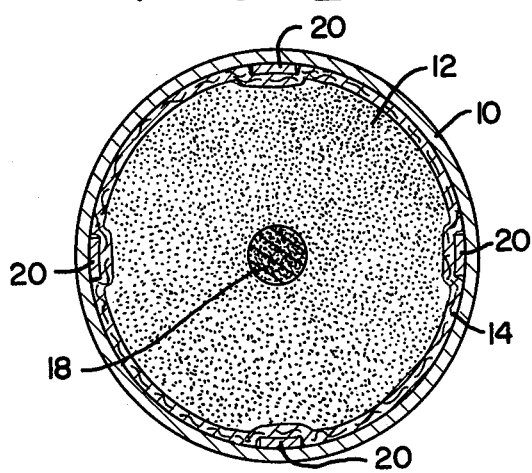
FIG. 2 is a plan view, in section, of the cell of FIG. 1.

As best illustrated in FIG. 3, four narrow, thin, equidistantly spaced apart, longitudinal stripes 20 of an electrolyte-impermeable material are placed adjacent to the cylindrical separator 14 on one side wall facing the anode cup 10. In the embodiment of the invention illustrated, the four stripes 20 are adhered to the side wall of the separator 14 and extend over the whole length thereof such that one end of each of the stripes 20 is located close to the bottom of the anode cup 10 and the other end protrudes a short distance beyond the top of the cathode mix 12, together with the upper edges of the separator 14 (see FIG. 1). The stripes 20 may be made from almost any electrolyte-impermeable material and may be adhered to the side wall of the separator 14 through the use of a suitable cement. Both the electrolyte-impermeable material and cement should of course be compatible with the cell electrolyte. Suitable, the stripes 20 may be made from a polyethylene film adhered to the separator 14 by a latex cement, for example. Preferably, however, the stripes 20 are made from a pressure sensitive cellulose or organic film tape such as "Scotch" brand tape manufactured commercially by 3M Company.

The seal closure for the cell comprises an annular insulating disc 22 which is gas-tightly sealed within the upper open end of the anode cup 10. Disc 22 is suitably molded from a plastic material and is formed on its top surface with an annular, stepped or raised portion 24 surrounding its outer periphery. The disc 22 is fitted tightly around the protruding end portion of the carbon electrode element 18 and its outer edges abut against the interior side wall of the anode cup 10. The upper side wall of anode cup 10 is turned or bent inwardly by a seal ring 26, suitable made of steel. This ring 26 is compressed or forced inwardly under a high radial pressure against the side wall of the anode cup 10 to form a tight radial seal between the abutting outer edges of the disc 22 and the interior side wall of the anode cup 10. A metal terminal cap 28 is fitted over the top of the carbon electrode element 18 and serves as the positive terminal of the cell.

A resealable vent is incorporated in the seal closure and is preferably constituted by a small vent aperture 30 which is provided in the insulating disc 22. The vent aperture 30 communicates with the void space 32 which is defined between the disc 22 and the exposed surface on the top of the cathode mix 12. The cathode mix 12 substantially fills the anode cup 10 to below its upper peripheral edges leaving enough space for the insulating disc 22 and the void space 32. Overlying the vent aperture 30 is a flat annular seal gasket 34. This gasket 34 may be made from any suitable elastomeric material, such as Tenite (cellulose acetate or cellulose acetate butyrate), and preferably covers the whole top surface of the annular stepped or raised portion 24 on the disc 22. The seal ring 26 has one leg element 26a which extends radially inwardly from the peripheral edge of the anode cup 10 and is mounted in resilient pressure contact against the top of the flat annular seal gasket 34. The leg element 26a constitutes a retaining member which biases the seal gasket 34 into normally sealing relation around the vent aperture 30. Upon the build-up of a predetermined excessive gas pressure in the void space 32, the leg element 26a deflects slightly in a direction away from the gasket 34 and allows gas to escape through the vent aperture 30. Once the gas pressure has been relieved, the resiliency of the leg element 26a causes it to again close or seal the aperture 30. A more detailed discussion of the resealable vent and its method of operation is given in U.S. Pat. No. 3,494,801 to L. F. Urry.

In the embodiment of the invention illustrated, the four longitudinal stripes 20 of electrolyte-impermeable material mask off those portions on the side wall of the anode cup 10 which lie adjacent to the stripes 20. The masked portions of the anode cup 10 do not corrode as the electrochemical cell reaction proceeds and there is no reaction product formed which might otherwise build-up and block the open channels that exist in and around the separator 14 in the vicinity of the stripes 20. It will be readily seen then that the four longitudinal stripes 20 establish an equal number of gas-venting passageways coincident to the stripes 20 which allow gas that is generated near the bottom of the cell to pass around the cathode mix 12 and into the void space 32 from whence the gas may escape through the vent.

In the practice of the invention, any number of longitudinal stripes 20 may be placed adjacent or adhered to the separator 14. Generally, the gas-venting passageway that is established by the provision of one longitudinal stripe 20 will suffice for the purpose of venting gas normally trapped at the bottom of the cell.

It should be understood that the placement of the stripes 20 is not too critical. The stripes 20 may be placed adjacent or adhered to either side of the separator 14 or they may be adhered directly to the side wall of the anode cup 10. Moreover, the stripes 20 need not protrude into the void space 32 as in the embodiment of the invention illustrated nor is it necessary for the stripes 20 to be located directly at the bottom of the anode cup 10 so long as they extend substantially the whole distance between the anode bottom and the void space 32.

Other modifications of the invention are of course possible. For example, the mask need not be composed of a longitudinal stripe but may be instead a spiral stripe such as shown in phantom lines at 20b in FIG. 3. Other shapes for the mask such as a tapered stripe may also be used as will readily occur to those skilled in the art.

As also shown in phantom lines in FIG. 3, a transverse, circumferential stripe 20c may be adhered to the middle section of the separator 14. The stripe 20c masks off the portion on the side wall of the anode cup 10 which lies adjacent thereto and prohibits its corrosion on discharge of the cell. The advantage of the circumferential stripe 20c is that a so-called "belly band" of unreacted metal (e.g. magnesium) is left as the anode cup 10 is consumed by the electrochemical cell reaction. The belly band serves to maintain the structural integrity of the anode cup 10 and prevents the cup from bulging or splitting in the event an excessive gas pressure builds up inside the cell. The stripe 20c may be adhered to either side of the separator 14 or directly to the side wall of the anode cup 10. Advantageously, the stripe 20c is employed in combination with either a longitudinal or spiral stripe 20, 20b, although it can be used alone solely to maintain the integrity of the anode cup 10 if desired.

In one example of the invention, a number of long C-size magnesium cells were constructed in which four pressure-sensitive organic film tapes were adhered longitudinally to a porous paper separator surrounding the cathode mix in the manner as described hereinabove. The tapes were approximately ¼ inch in width. The cells were subjected to short circuit discharge, and there were no cell failures.

Thus it will be seen that the invention provides a primary dry cell in which gas generated near the bottom of the cell can pass around the cathode mix and into the void space from whence the gas can escape through a vent in the seal closure. It will of course be apparent that the advantages made possible by the invention cannot be fully realized unless the vent that is used in the seal closure is capable of venting the gas at a high rate from inside the cell. Various types of high rate vents can of course be used. So-called "plug vents" can be employed, for example, which are capable of venting gas at high rates, although these vents are not resealable. Such vents consist of a vent opening in the closure disc which is sealed by a plug of wax or other low melting point sealant. The plug is expelled from the vent upon the development of high internal gas pressure or temperature or both. A vent of this type which has proven particularly advantageous for use in magnesium cells and which is recommended for use in primary dry cells of the invention is disclosed and claimed in the co-pending application of L. F. Urry, Ser. No. 384,446, filed on Aug. 1, 1973.

It should be understood that, although the greatest need for this invention is in the magnesium cell which conventionally employs an electrolyte- and gas-permeable paper separator, the invention also is applicable to cells employing an electrolyte-permeable, gas-impermeable separator. Gel coated paper, methyl cellulose film, cellophane and the like are examples of separators which are substantially gas-impermeable. In this instance, the mask or stripes act not to preserve gas-paths through a porous separator but rather to establish and maintain surface channels between the non-adhering face of the mask or stripes and the anode cup or between the separator portion underneath the mask or stripes and the anode cup. Cells that may employ electrolyte-permeable, gas-impermeable separators include, in addition to the magnesium cell, Leclanche cells and zinc chloride cells.

What is claimed is:

1. A primary dry cell comprising a metal anode cup of magnesium having an open top end which is gas-tightly sealed by a closure including a vent and having a cathode mix therein comprising particles of a metal oxide depolarizer, finely divided conductive material and an electrolyte, separated from the side wall of said anode cup by an electrolyte-permeable separator, with a void space separating said closure and said cathode mix, and having at least one electrolyte-impermeable stripe lying adjacent said separator over a portion thereof between said anode cup and said separator and extending substantially the whole distance between the bottom of said anode cup and said void space for providing a gas venting passageway coincident to said impermeable stripe.

2. The primary dry cell as defined by claim 1, wherein said stripe is longitudinally connected to one side of said separator.

3. The primary dry cell as defined by claim 1, wherein said stripe is longitudinally connected to the side wall of said anode cup.

4. The primary dry cell as defined by claim 1, wherein said stripe is spirally disposed about one side of said separator.

5. The primary dry cell as defined by claim 1, wherein said stripe is spirally disposed about the side wall of said anode cup.

6. The primary dry cell as defined by claim 1, wherein said stripe comprises a pressure sensitive cellulose or organic film tape adhered to the side wall of said separator.

7. The primary dry cell as defined by claim 1, wherein a central carbon electrode element is embedded in said cathode mix and protrudes slightly beyond the open end of said anode cup and wherein said closure comprises an annular insulating disc gas-tightly fitting around said carbon electrode element and within said open end of said anode cup.

8. The primary dry cell as defined by claim 2, wherein four longitudinal stripes are adhered 90 degrees apart to one side of said separator.

9. The primary dry cell as defined by claim 2, wherein a circumferential stripe of electrolyte-impermeable material is adhered to one side of said separator.

10. The primary dry cell as defined by claim 7, wherein said vent comprises a vent aperture in said annular insulating disc, a seal gasket overlying said vent aperture and a seal ring surrounding the peripheral edges of said anode cup and having a leg element extending inwardly and biasing said seal gasket into sealing relation around said vent aperture, said leg element being deflectable in a direction away from said seal gasket upon the build-up of a predetermined high internal gas pressure inside said cell.

11. The primary dry cell as defined by claim 7, wherein said vent comprises a vent opening in said annular insulating disc which is closed by a seal plug made of a low melting point sealant and which is expelled from said vent opening upon the build-up of a predetermined high internal gas pressure or temperature inside said cell.

12. In a primary dry cell comprising a metal anode cup of magnesium having an open top end which is gas-tightly sealed by a closure and having a cathode mix therein comprising particles of a metal oxide depolarizer, finely-divided conductive material and an electrolyte, separated from the side wall of said anode cup by an electrolyte-permeable separator, said separator being in contact with said anode cup, the improvement comprising wherein a circumferential stripe of an electrolyte-impermeable material is placed adjacent to said separator between said anode cup and said separator for masking off a portion of the side wall of the anode cup so as to maintain the structural integrity of the anode during consummation of the cell.

13. In a primary dry cell as defined in claim 12 further comprising a void space separating said closure and said cathode mix and at least another electrolyte-impermeable stripe lying adjacent said separator over a portion thereof and extending substantially the whole distance between the bottom of the anode cup and said void space.

* * * * *